Schwartz

United States Patent [19]

[11] 4,162,342
[45] Jul. 24, 1979

[54] FOAM COATED CEILING BOARD FACING AND METHOD OF MAKING THE SAME

[75] Inventor: William C. Schwartz, Greensboro, N.C.

[73] Assignee: Burlington Industries, Inc., Greensboro, N.C.

[21] Appl. No.: 718,624

[22] Filed: Aug. 30, 1976

[51] Int. Cl.² ........................... B32B 3/12; B05D 5/00
[52] U.S. Cl. ..................................... 428/159; 156/78; 427/244; 427/262; 427/264; 427/266; 427/277; 427/278; 428/201; 428/310; 428/313; 428/920
[58] Field of Search ............... 427/244, 365, 278, 373, 427/428, 369, 366, 277, 262, 264, 266; 428/159, 160, 313, 314, 317, 141, 201, 310, 920; 260/2.5 FP; 156/78

[56] References Cited

U.S. PATENT DOCUMENTS

| | | | |
|---|---|---|---|
| 3,391,013 | 7/1968 | Videen | 427/278 |
| 3,607,341 | 9/1971 | Goins et al. | 427/373 X |
| 3,639,298 | 2/1972 | Lister et al. | 260/2.5 FP |
| 3,713,868 | 1/1973 | Gordon et al. | 428/314 X |
| 3,974,312 | 8/1976 | Stevens et al. | 428/313 X |

Primary Examiner—Evan K. Lawrence
Attorney, Agent, or Firm—Cushman, Darby & Cushman

[57] ABSTRACT

A cellular foam coated fabric suitable for use as a ceiling board facing is produced by sculpturing a layer of vinyl or acrylic foam on at least one side of a nubby textured greige fabric, the foam containing a latex polymer cell producing surfactant, a white powdered pigment, and flame retardants if required. The foam is applied to the fabric in quantities sufficient to cover the face of the fabric, which is then passed through gapped means such as gapped pad rolls. These gapped rolls distribute the foam onto the entire face of the fabric and remove excess foam to provide extra depth and nubbiness to said fabric face without hiding completely the original fabric pattern without crushing the foam or the fabric. The result is a three-dimensional or sculptured fabric with the foam greatly enhancing the loft, texture and nubbiness of the fabric. The coated fabric is useful as a ceiling board facing.

22 Claims, 3 Drawing Figures

4,162,342

FOAM COATED CEILING BOARD FACING AND METHOD OF MAKING THE SAME

BACKGROUND OF THE INVENTION

The present invention relates to a foam coated fabric used as a ceiling board facing, and a process for making this foam coated fabric.

There are several commercially available ceiling boards which utilize glass fabric as the decorative facing. Generally, however, the fabric covered board is spray painted in a separate operation to achieve the desired textured, three-dimensional, and nubby appearance. Ceiling board manufactures have frequently expressed their need for a pre-finished fabric which would exhibit and retain a three-dimensional, nubby appearance, and which requires only lamination to a base substrate to produce a saleable ceiling board.

Previous work has concentrated on utilizing various weave designs employing textured fill yarns as a means of obtaining a nubby appearance. Suitable fabrics were then padded with highly loaded solutions of resin and pigment for color and opacity. The fabrics which resulted, however, did not exhibit the required texture and nubby appearance sought by the industry.

SUMMARY OF THE INVENTION

The present invention provides a foam coated fabric useful as a ceiling board facing, and a process for making this foam coated fabric.

It is an object of the present invention to develop improved nonflammable fabric for ceiling board facing which has a textured, three-dimensional, and nubby appearance.

It is another object of the present invention to develop improved nonflammable fabric for ceiling board facing which exhibits a pre-finished or "pre-painted" appearance.

It is a further object of the present invention to develop improved nonflammable fabric for ceiling board facing which exhibits distinct and varied surface features.

Surprisingly, it has been found that the objects of the present invention can be achieved by applying a cellular foam to a nonflammable fabric in quantities sufficient to totally cover the fabric, which is then passed through gapped means such as partially open or gapped pad rolls. These gapped rolls distribute the foam onto the fabric and remove excess foam to provide extra depth and nubbiness to the fabric face without crushing the foam or the base fabric. The result is a sculptured fabric with the foam greatly enhancing the loft, texture, and nubby appearance of the base fabric.

DESCRIPTION OF THE PREFERRED EMBODIMENTS

Figure 1:
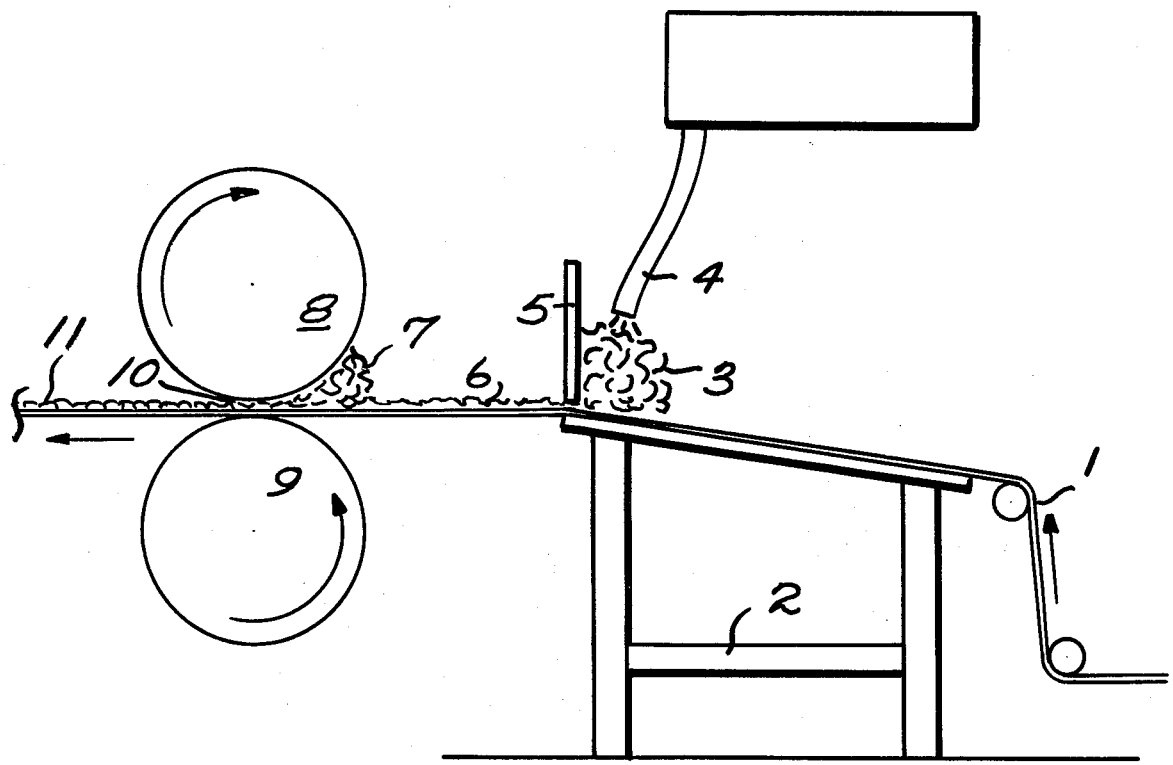
FIG. 1 is a schematic view showing the various steps carried out in the process of the present invention when the foam is applied to only one side of the greige fabric.

Upon inspection of FIG. 1, it will be seen that one side of a textured greige fabric (1) is first treated on a coating table (2) by applying a foam (3) from a foaming machine by means of a foam hose (4). A coating knife blade (5) is adjusted to apply a thin layer of foam to the fabric. At this point (6), the fabric is coated with a uniform smooth layer of from on the fabric face. The coated fabric then passes between gapped pad rolls (8) and (9), with the gap (10) being adjusted to obtain the desired appearance. Pad foam puddle (7) forms as the coated fabric enters the gapped pad rolls. The result is a sculptured fabric with the foam greatly enhancing the loft, texture, and nubby appearance of the textured greige fabric.

Figure 2:
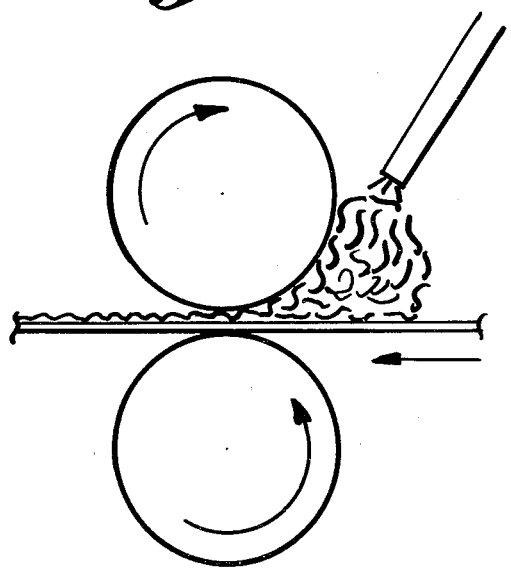
FIG. 2 is a fragmentary view of a modification of the process illustrated in FIG. 1.

FIG. 2 illustrates a modification of the above-described process in which the foam hose (4) applies foam to one side of a textured greige fabric (1) immediately before the fabric passes between gapped pad rolls (8) and (9). In this modification of the process coating table (2) and coating knife blade (5) are not required. The fabric (1) does not have to be coated first using coating table (2) and coating knife blade (5), although the process is easier to control by first coating the fabric as illustrated in FIG. 1. In the modification illustrated in FIG. 2. the foam puddle (7) causes the entire surface of the fabric to become saturated with foam. Dams (not illustrated) may be used on the top roll (8) to keep excess foam from running off the fabric.

Figure 3:
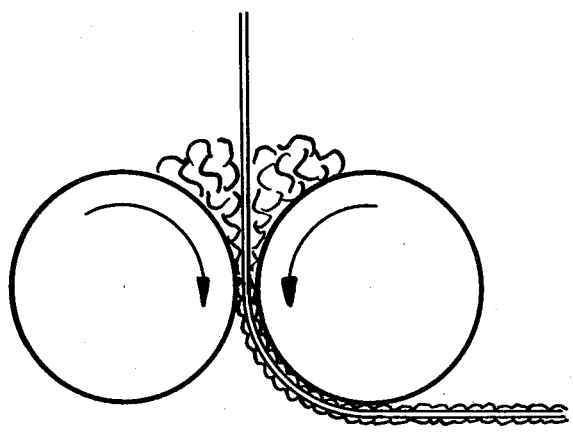
FIG. 3 is a fragmentary view of another modification of the process illustrated in FIG. 1, when foam is applied to both sides of the greige fabric.

FIG. 3 illustrates another modification of the above-described process in which foam is applied to both sides of a textured greige fabric (1) immediately before the fabric passes between horizontal gapped pad rolls (8) and (9). If the textured greige fabric (1) is a balanced weave fabric, both sides of the coated sculptured fabric (11) will show the same degree of loft, texture, and nubby appearance.

The textured greige fabric used in the process of the present invention is characterized by a certain degree of nubbiness and texture. The desired degree of nubbiness and texture may be obtained by using textured fill yarns. Texture is a term which describes the surface effect of a fabric, or the structural quality of a fabric. As defined in *Man-Made Fiber and Textile Dictionary* (Celanese Corporation 1974), texturing is a process of crimping, imparting random loops, or otherwise modifying continuous filament yarn to increase cover, resilience, abrasion resistance, warmth, insulation, and moisture absorption or to provide a different surface texture. The textured fabrics used in the present invention are textured yarns as described in the *Man-Made Fiber and Textile Dictionary*, which is hereby incorporated by reference. For example, one suitable textured fill yarn is identified as TEX 129 yarn, which is a textured glass yarn manufactured by the Burlington Industrial Fabrics Division of Burlington Industries, Incorporated. TEX 129 yarn is manufactured by the air jet method, as described in the *Man-Made Fiber and Textile Dictionary*. In this method of texturing, yarn is fed through the turbulent region of an air jet at a rate faster than it is drawn off at the far side of the jet. In the jet, the yarn structure is opened, loops are formed, and the structure is closed again. Some loops are locked inside and others are locked on the surface of the yarn. The product of this process, such a TEX 129, is an entangled yarn suitable for use in the process of the present invention. Other textured yarns may also be used. In general, the bigger and bulkier the textured fill yarn, the greater the three dimensional character of the final fabric. However, a balance between the bulky fill yarns and the smooth filament warp yarns is desirable. The desired balance gives the illusion of depth and leads to high and low areas in the fabric. TEX 129 yarn is considered to be a large bulky yarn suitable for use in the process of the present invention. Other textured fill yarns, including textured fill yarns which are smaller, may be used. If textured fill yarns which are less bulky are used, the resulting product will naturally be flatter. The degree of nubbiness of the textured greige fabric used in the process of the present invention is widely variable depending upon the appearance desired in the finished product.

The textured greige fabrics used in the present invention are typically glass fiber fabrics. The glass fiber fabrics used are woven, knitted, or non-woven fabrics, most commonly woven, composed of yarn made of glass fibers or filaments, or in the case of non-wovens, discrete glass fibers. However, any fabric which has the desired texture or nubby appearance may be used, provided that when such textured greige fabric is processed according to the present invention, that the final product satisfy the relevant flammability specifications. The relevant flammability specifications are set forth in the test methods known as ASTM-E 84 or UL 723, which are hereby incorporated by reference. These methods test the fire hazard classification of building materials. For commercial products a class A rating as defined in these tests is generally desired.

Glass fiber fabrics are preferred in the process of the present invention since they are inherently nonflammable. A particularly preferred glass fiber fabric is identified as S/1963 and is sold by the Burlington Glass Fabrics Company, a division of Burlington Industries, Inc. of Greensboro, N.C. A particularly preferred S/1963 fabric is made from a wrap yarn with 18 ends per inch of ECG 150 1/0 filament yarn, and a TEX 129 fill yarn with 16 picks per inch in the fill. An ECG 150 1/0 filament yarn is a fiberglass textile yarn, specifically an electrical glass, continuous filament yarn with an average filament diameter equivalent to 0.00036 inches and 15,000 yards of bare glass filament per pound. The "1/0" indicates that a single strand is twisted in the finished plied yarn.

The foam is applied under a knife blade set for a gap of from about 40 mils to about 80 mils, the blade being adjusted to apply a thin uniform smooth layer of foam to the fabric face. The proper adjustment of the knife blade will of course depend upon the characteristics of the textured greige fabric and the foam.

Typical foams are vinyl or acrylic based foams containing base resin, a cell producing surfactant, and a white powdered pigment to give whiteness and opacity. In addition, flame retardants can be added to the foam if desired. A mixture of base resins can be utilized in formulating foams used in the process of the present invention to achieve desired properties, such as hand, flame retardancy, durability, and light fastness. Plasticizers may also be added to the foam compositions for a specific property. The polymers used in the process of the present invention are typically in the form of an aqueous emulsion, sometimes referred to as a latex. In the process of the present invention, preferred foams are vinyl based foams because of the flame retardancy of vinyl chloride latex polymers. Preferred foams may contain in addition to vinyl chloride latex polymers, a variety of acrylic based latexes to achieve desired properties, such as hand, durability, and light fastness. It is found that the acrylic helps bind pigment to the fiber.

A most preferred foam composition would be a vinyl/acrylic based latex consisting of (1) a cell producing surfactant, such as ammonium or potassium stearate; (2) a white powdered pigment such as titanium dioxide added to give opacity and whiteness; and (3) a flame retardant such as antimony oxide and aluminum hydrate. In addition to titanium dioxide pigments, suitable powdered pigments include antimony oxide, zinc oxide, aluminum hydrate and barium carbonate. Clay type fillers and talc powders may also be used, the only criterion being that the final product be opaque and sufficiently reflective for use as a ceiling board facing. The amount of white powdered pigment used in the foams described typically ranges from about 10 percent by weight to about 50 percent by weight. In addition to ammonium or potassium stearate, the cell producing surfactant may generally be any common salt of stearic acid especially the salts with alkali metals, and ammonia, and amines. More generally, salts of higher fatty acids may be used, the stearates, however, being particularly preferred. The amount of cell producing surfactant used in the foams described typically ranges from about 2 percent by weight to about 10 percent by weight. Flame retardants, in addition to antimony oxide and aluminum hydrate, typically include non-flammable plasticizers such as tricresyl phosphate or flame retardant agents such as borax, boric acid, diammonium phosphate or a combination of these. The amount used is about 10 to about 50 percent by weight of the foam composition.

The foam composition is formed by mixing the various materials described above. Typically, the various ingredients are mixed as follows. The dry pigments and powders such as antimony oxide, aluminum hydrate, and titanium dioxide are premixed with water to give a slurry or paste using e.g., a Cowles or Eppenbach mixer. A cell forming surfactant is added to this slurry and mixed thoroughly. This mixture is then added to the base resin(s) with moderate stirring. If increased viscosity is desired, suitable thickening agents such as sodium polyacrylate compounds in combination with ammonium hydroxide may be used. The total solids content in the foam composition will depend primarily upon the degree of opacity and whiteness desired in the final product, and on the stability of the foam solution. Generally a higher solids content is desired, but the resulting solution may be more difficult to foam. Ordinarily the solids content will be in the range of about 40 to about 70 percent by weight. The foam is prepared by processing the foam solution in a conventional commercially available foaming machine which aerates the solution into a foam. The cell producing surfactant is of course responsible for the quality and stability of the foam.

In the process of the present invention the gap between the gapped pad rolls, (8) and (9), is critical in determining the final appearance of the fabric. Too little or no gap at all will produce an appearance having little more texture than the greige fabric. Too large a gap produces an excessively sculptured foam with the final product showing little if any of the original weave pattern. A sculptured foam fabric is a foamed fabric containing sufficient foam on the fabric to provide extra depth and nubbiness to the base weave. However, the fabric retains its basic weave which is not hidden completely by the foam coating. On the other hand, an excessively sculptured foam fabric contains excess foam on the fabric which practically hides the original weave. An excessively sculptured foam fabric shows sculpturing only as a result of the pad roll touching the foam at the relatively high points, making the foam surface non-uniform. An excessively sculptured foam is not necessarily undesirable. However, it is difficult to produce an excessively sculptured foam consistently. Furthermore, an excessively sculptured foam may have poor properties such as poor abrasion, dusting of the finish, and poor clean ability. A suitable gap setting achieves a fabric which retains in some measure the original fabric pattern, but yet exhibits a high degree of loft, texture, and nubby appearance. It will be noted from FIG. 1 that the gap is primarily between the face of the fabric coated with a thin uniform smooth layer of foam and the top pad roll (8). This makes it possible to keep the fabric back relatively smooth for easier lamination to a ceiling board. The top pad roll (8) as it turns with the coated fabric removes excess foam from the fabric and forms a puddle (7) behind the roll. The top roll sculptures the fabric face giving a high degree of loft and texture to the fabric (11), which is then dried and cured in an oven and rolled up.

The gap between the rolls depends on the fabric used. For S/1963 fabric, a gap of about 80 mils between the pad rolls (10) gives good results. In general, the gap between the pad rolls (10) will range between about 10 mils to about 100 mils, depending upon the fabric used.

The textured fabric used in the process of the present invention is generally a griege fabric in an unbleached, undyed state. However, the textured fabric used may optionally be printed by an conventional technique for extra effect, if desired. The print applied to the textured greige fabric appears to become an integral part of the foam and a very pleasant contrast is achieved which adds depth and dimension to the fabric face. It is also possible to introduce foreign particles, such as chopped fibers or cork, into the foam itself for special effects. By varying the starting textured dried fabric and using the process of the present invention as described, a wide variety of ceiling boards can be produced.

In the event that a printed textured fabric is used in the process of the present invention, pretreatment of the fabric is necessary. Greige textured glass fabric is difficult to print because of glass lint from the textured fill yarns which adversely affects the final quality of the print. The lint may get into the print paste, in the engraving itself, and interfere with normal printing resulting in steaks, blotchiness, and a non-uniform print. To remove this lint, the fabric can be washed or better still can be heat cleaned at temperatures of 1100° to 1300° F. for a period of 30 to 60 seconds to vaporize starches and other organic material present on the fabric and which also loosens the lint, washed in water to remove the loose lint, and then protected with an acrylic based finish. This finish protects the glass fabric during printing and also aids in "tying down" loose glass filaments which could cause further lint problems. A typical finish would be padding a 5-10% solution of soft acrylic resin such as Rhoplex HA-8 (Rohm & Haas Co., Philadelphia, Pa.) on the fabric at 25 pounds pad pressure and drying the fabric at 350° F. for two minutes.

The sculptured fabric which is the product of the process of the present invention may be laminated to a substrate to produce a ceiling board. The details of the lamination process will depend of course upon the type of adhesive used. In a preferred embodiment, a wet adhesive such as vinyl acetate based adhesives or acrylic based adhesives is applied to the sculptured fabric back and to a substrate material, such as a glass wool board. The sculptured fabric is pressed on the board using a roll to insure good contact. The coated substrate material may be heated to dry the adhesive. Ceiling boards manufactured by this technique exhibit a sculptured or three dimensional appearance with the foam greatly enhancing the loft, texture, and nubby appearance of the base fabric.

Colored pigments or dyes can be added to the foam solution before foaming to produce foams of various shades. These pigments are selected for their lightfastness and compatibility with the foaming solution. The pigments most preferred are similar to those used in the paint industry and could be added as powders or aqueous pastes with the latter being preferable. The typical pigments are inorganic iron oxide yellows and reds, and carbon black dispersions, and organic phthalocyanine blue and green pigments.

EXAMPLE

I. Fabric—S/1963/48; 48 stands for width of fabric
II. Foam Composition
    90 parts—Rhoplex HA-16 (Rohm & Hass Co., Philadelphia, Pa.)
    210 parts—Geon 351 (B. F. Goodrich Chemical Co., Cleveland, Ohio.)
    45 parts—water
    6 parts—ammonium hydroxide (28% concentrated)
    30 parts—aluminum hydrate
    60 parts—titanium oxide
    15 parts—antimony oxide
    45 parts—potassium stearate (20% concentration) (Soap PS-made by Burlington Chemical Division of Burlington Industries, Jamestown, N.C.)

Add ammonia to water and stir or mix in aluminum hydrate, titanium oxide, and antimony oxide powders under high shear by using Cowles or Eppenbach mixer until an uniform paste is achieved. Add Soap PS still under high shear. This slurry is then added to the base resins which were previously mixed together. The foaming solution is then mixed for a period of 5 to 10 minutes at low or medium shear.

The solution is then foamed with a commercial foaming machine to give a "cup weight" or a wet foam density of 15 to 20 grams per 100 ml volume.

III. Running Conditions
  (a) Set the gap between the pad rolls at 80 mils
  (b) The amount of foam applied to the fabric as a coating varies depending on the speed of the process and also on the pick-up of foam. It is desirable to reach an equilibrium point where the amount of foam applied to the fabric is equal to the amount of foam which the fabric actually picks up.
  (c) The speed, drying temperatures, etc. are dependent on fabric width, the type of dryers available, the amount of foam pick-up, etc. It will suffice to mention that the particular foam in question will dry/cure at one minute at 400° F. when applied to the fabric to give a dry or final foam pick-up of two ounces per square yard.

It is understood that various other modifications will be apparent to and can readily be made by those skilled in the art without departing from the scope and spirit of this invention. Accordingly, it is not intended that the scope of the claims be limited to the description as set forth herein but rather that the claims be construed as encompassing all the features which reside in the present invention including all features which would be treated as equivalents thereof by those skilled in the art to which the invention pertains.

What is claimed is:

1. A process for manufacturing a cellular foam coated, sculptured, nubby fabric useful as a ceiling board facing and the like, comprising:

forming on at least one face of a nubby textured fabric a uniform layer of a cellular foamed latex containing vinyl chloride polymer, a cell producing surfactant, a white powdered pigment, and a flame retardant, passing said nubby textured fabric coated with a uniform layer of cellular foamed latex between gapped means for removing foam and sculpturing said uniform layer of cellular foamed latex, the gap of said gapped means being adjusted to leave sufficient foam on the fabric to provide extra depth and nubbiness to said fabric face without hiding completely the original fabric pattern and without crushing said cellular foam, and drying and curing said cellular foam coated, sculptured, nubby fabric.

2. A process as set forth in claim 1 in which said textured fabric is a textured glass greige fabric.

3. A process as set forth in claim 1 in which said textured fabric is a textured glass printed fabric.

4. A process as set forth in claim 1 in which said foamed latex consists of an acrylic and vinyl chloride copolymer, a cell producing surfactant, a white powdered pigment, and a flame retardant.

5. A process as set forth in claim 1 in which said cell producing surfactant is an alkali metal salt of stearic acid or ammonium stearate, said white powdered pigment is titanium dioxide, and said flame retardant is antimony oxide or aluminum hydrate.

6. A process as set forth in claim 1 in which said uniform layer of foamed latex is from about 40 mils to about 80 mils in depth.

7. A process as set forth in claim 1 in which said gapped means are gapped between about 10 mils and about 100 mils.

8. A process for manufacturing a cellular foam coated, sculptured, nonflammable ceiling board from a ceiling board facing manufactured as set forth in claim 1, consisting of:

laminating said ceiling board facing to a substrate.

9. A process as set forth in claim 1 in which said gapped means are gapped pad rolls.

10. A process as set forth in claim 2 in which said gapped means are gapped pad rolls.

11. A process as set forth in claim 3 in which said gapped means are gapped pad rolls.

12. A process as set forth in claim 4 in which said gapped means are gapped pad rolls.

13. A process as set forth in claim 5 in which said gapped means are gapped pad rolls.

14. A process as set forth in claim 6 in which said gapped means are gapped pad rolls.

15. A process as set forth in claim 7 in which said gapped means are gapped pad rolls.

16. A process as set forth in claim 8 in which said gapped means are gapped pad rolls.

17. A process for manufacturing a cellular foam coated, sculptured, nubby fabric useful as a ceiling board facing and the like, consisting of:

forming on at least one face of a nubby textured fabric a uniform layer of foamed cellular latex containing vinyl chloride polymer, a cell producing surfactant, a white powdered pigment, and a flame retardant, passing said nubby textured fabric coated with a uniform layer of cellular foamed latex between gapped means for removing foam and sculpturing said uniform layer of cellular foamed latex, the gap of said gapped means being adjusted to leave sufficient foam on the fabric to provide extra depth and nubbiness to said fabric face without hiding completely the original fabric pattern and without crushing said cellular foam, and drying and curing said cellular foam coated, sculptured, nubby fabric.

18. A process as set forth in claim 17 in which said gapped means are gapped pad rolls.

19. A cellular foam coated, sculptured, nubby fabric useful as a ceiling board facing manufactured by the process of:

forming on at least one face of a nubby textured fabric a uniform layer of cellular foamed latex containing vinyl chloride polymer, a cell producing surfactant, a white powdered pigment, and a flame retardant, passing said nubby textured fabric coated with a uniform layer of cellular foamed latex between gapped means for removing foam and sculpturing said uniform layer of cellular foamed latex, the gap of said gapped means being adjusted to leave sufficient foam on the fabric to provide extra depth and nubbiness to said fabric face without hiding completely the original fabric pattern and without crushing said cellular foam, and drying and curing said cellular foam coated, sculptured nubby fabric.

20. A cellular foam coated, sculptured, nubby ceiling board manufactured by the process of:

laminating a ceiling board facing according to claim 19 to a substrate.

21. A cellular foam coated, sculptured, nubby fabric useful as a ceiling board facing manufactured by the process of:

forming on at least one face of a nubby textured fabric a uniform layer of a cellular foamed latex containing vinyl chloride polymer, a cell producing surfactant, a white powdered pigment, and a flame retardant, passing said nubby textured fabric coated with a uniform layer of cellular foamed latex between gapped pad rolls, gapped between about 10 mils and about 100 mils, removing foam and sculpturing said uniform layer of cellular foamed latex to provide extra depth and nubbiness to said fabric face without hiding completely the original fabric pattern of said fabric face without crushing said cellular foam, and drying and curing said cellular foam coated, sculptured, nubby fabric.

22. A cellular foam coated, sculptured, nubby ceiling board manufactured by the process of:

laminating a ceiling board facing according to claim 21 to a substrate.

* * * * *